Nov. 17, 1964 R. W. HAFEMEISTER 3,157,405

CHUCK

Filed Jan. 30, 1963 2 Sheets-Sheet 1

INVENTOR.
ROBERT W. HAFEMEISTER
BY
Kimmel & Crowell
ATTORNEYS.

Nov. 17, 1964   R. W. HAFEMEISTER   3,157,405
CHUCK

Filed Jan. 30, 1963

INVENTOR.
ROBERT W. HAFEMEISTER
BY
Kimmel & Crowell
ATTORNEYS.

United States Patent Office 3,157,405
Patented Nov. 17, 1964

3,157,405
CHUCK
Robert W. Hafemeister, 321 Willow Lane,
Menasha, Wis.
Filed Jan. 30, 1963, Ser. No. 255,022
4 Claims. (Cl. 279—2)

This invention relates to a chuck, and more particularly to a chuck for holding hollow cores, tubes, or other articles having cylindrical bores or openings therein.

A primary object of this invention is the provision of an improved chuck which is automatically expansible to retain the core or tube in position when inserted into the bore, and automatically retractable when withdrawn therefrom.

An additional object of the invention is the provision of a chuck of this character which is self accommodating to irregularities in the bore of the core or tube.

A further object of the invention is the provision of such a chuck which may be re-utilized indefinitely without damage either to the chuck or the bore of the article.

An additional object of the invention is the provision of a device of this character having a comparative minimum of operating parts, which is entirely mechanical in operation, and operates upon the introduction of the chuck into the bore and the withdrawal thereof automatically to clamp or release the same, which is sturdy and durable in construction, which is reliable and efficient in operation, and which is relatively simple and inexpensive to manufacture and utilize.

Still other objects reside in the combinations of elements, arrangements of parts, and features of construction.

Other objects will in part be obvious and in part be pointed out hereinafter as the description of the invention proceeds, and disclosed in the accompanying drawings wherein.

Similar reference characters refer to similar parts throughout the several views of the drawing.

Figure 1:
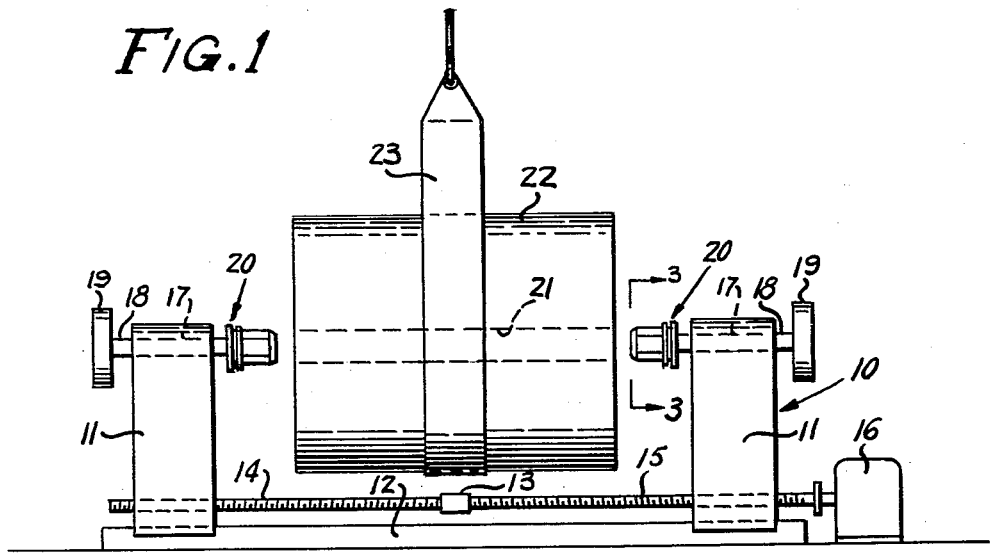
FIGURE 1 is a side elevational view of one form of work holder embodying the chuck of the instant invention shown in association with a core in released position.
Figure 2:
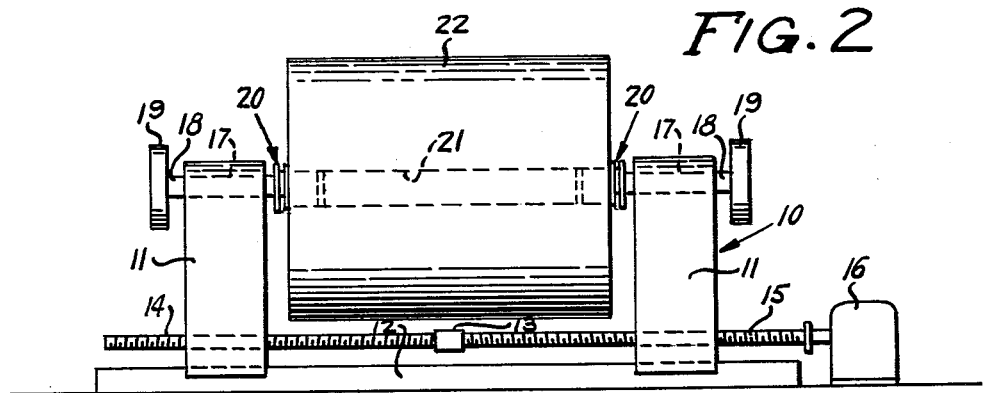
FIGURE 2 is a view similar to FIGURE 1 showing the work holder in clamping or closed position.
Figure 3:
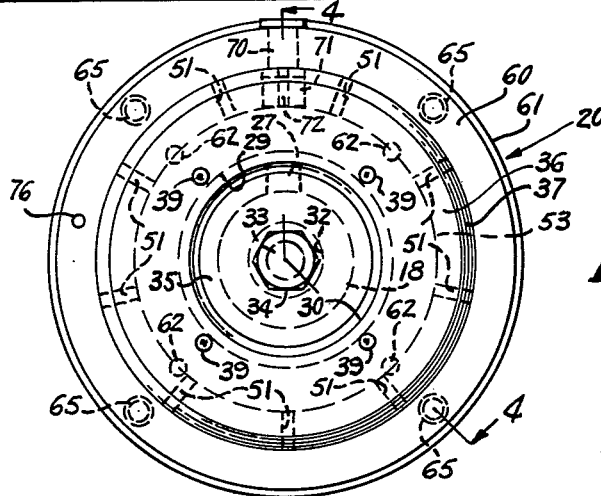
FIGURE 3 is an enlarged end elevational view of one form of chuck embodying the instant inventive concept taken substantially along the line 3—3 of FIGURE 1 as viewed in the direction indicated by the arrows.
Figure 4:
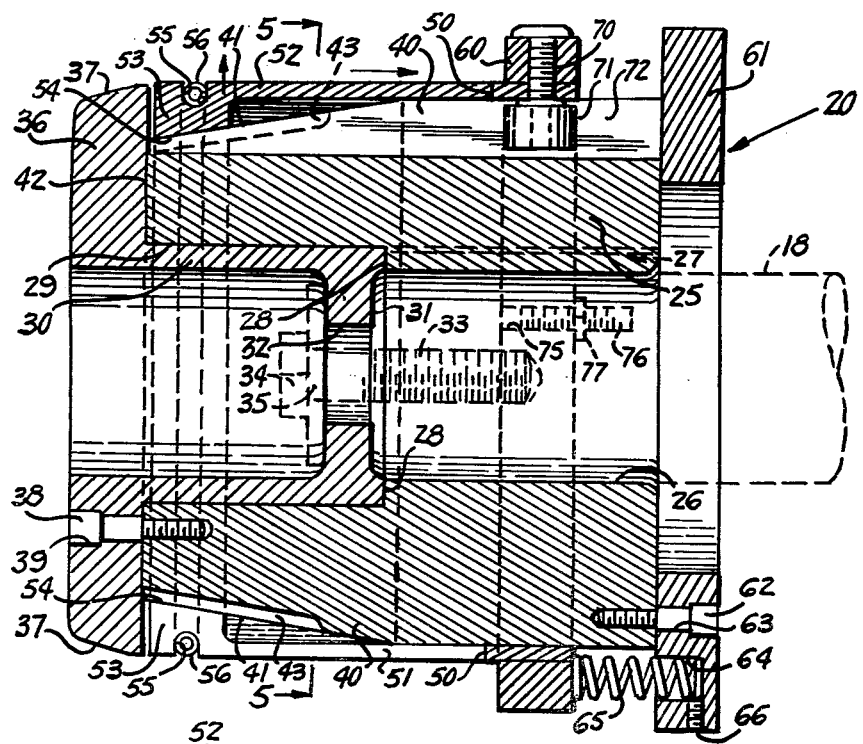
FIGURE 4 is an enlarged sectional view taken substantially along the line 4—4 of FIGURE 3 as viewed in the direction indicated by the arrows.
Figure 5:
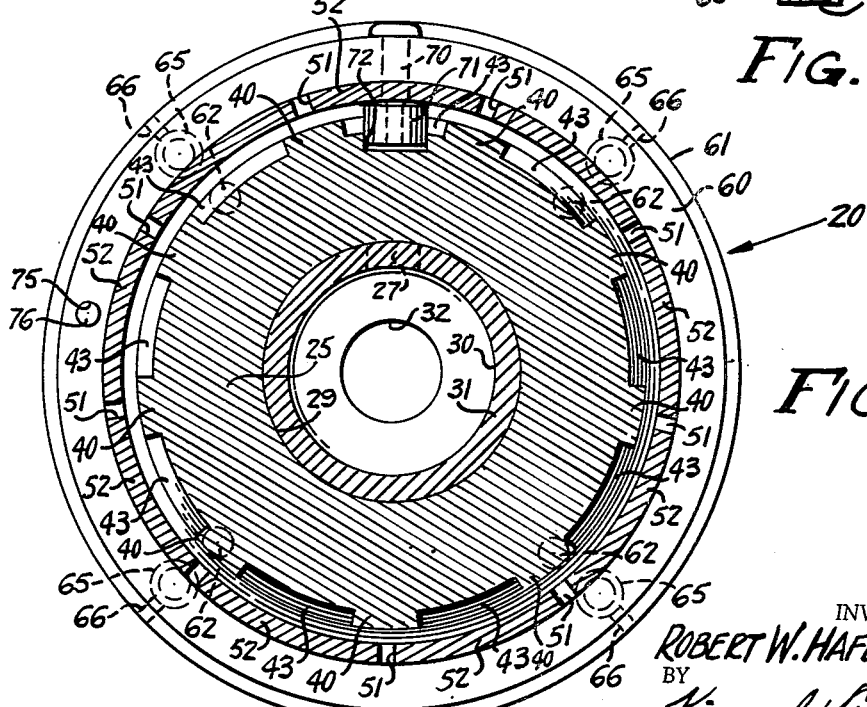
FIGURE 5 is a sectional view taken substantially along the line 5—5 of FIGURE 4 as viewed in the direction indicated by the arrows.

Having reference now to the drawings, and more particularly to FIGURES 1 and 2, there is generally indicated at 10 a work holder or the like which may be of any conventional type, and which is illustratively shown as comprising a pair of uprights 11 which are linearly movable along a base 12 by means of a screw 13, which has opposite threads 14 and 15 at its opposite ends. The screw may be rotated by means of a motor 16 or manually, or in any other desired manner.

Each of the uprights 11 is provided with a bore 17, through which extends a rotatable shaft 18, which may be provided with a brake or pulley 19 at its outer extremity, or any other desired means for rotating or holding back the same as desired. The chuck of the instant invention is generally indicated at 20, there being a chuck provided on the inner end of each shaft 18 which is adapted to engage in a bore 21 of a core 22, a tube, or any other article having a generally tubular bore extending therethrough. The core 22 is adapted to be positioned by means of a sling 23, or in any other desired conventional manner. When the motor 16 is energized, the uprights 11 and their associated chucks 20 move into the ends of bore 21, as shown in FIGURE 2, and automatically clampingly engage the portions of the article defining the bore, in a manner to be more fully described hereinafter, securely to retain the core 22 or other analogous article for any desired purpose.

The chuck of the instant invention is comprised of an inner sleeve 25 having a bore 26 therein for the reception of shaft 18. The sleeve 25 is secured for rotation with shaft 18 by means of a key 27 seating in aligned keyways in the shaft and the interior of bore 26.

The end of bore 26 terminates in a shoulder 28 forming the end of an enlarged recess 29 in which is adapted to seat a bushing 30 having an end portion 31 which is apertured as at 32 to permit passage of a screw 33 having a head 34 seating against a washer 35 to hold bushing 30 and inner sleeve 25 in related assembly with the shaft 18. Bushing 30 terminates in a relatively thick flange or collar 36 having a beveled rim 37, screws 38 seating in countersunk bores 39 serving to hold the flange bushing 30 in related assembly with sleeve 25.

A multiplicity of radial flutes 40 are provided exteriorly of inner sleeve 25 and have inclined outer surfaces 41 over at least a portion of their length ranging from a minimum diameter at the end 42 of inner sleeve 25 in abutting relation with the inner side of flange 37 to a maximum diameter toward the other end of the inner sleeve 25. Flutes 40 are provided with longitudinal grooves or channels 43, the purpose of which will be more fully described hereinafter.

An outer sleeve or ring 50 surrounds inner sleeve 25 and is provided with a plurality of longitudinally extending slots 51 which form a multiplicity of flexible fingers 52, each of which is provided on its underside with a protuberance 53 having an inner inclined surface 54 conforming to the angle of inclination 41 of the flutes 40. The protuberances ride linearly of the axis of inner sleeve 25 in grooves or channels 43. An annular groove 55 extends about fingers 52 over the protuberances 53 and contains a coil spring 56 or other resilient means which normally holds the fingers and their associated protuberances in sliding contact with the inclined surfaces 41.

An annulus or ring 60 is secured to the rear or annular portion of outer sleeve 50, and is suitably secured thereto in any desired manner, as by welding, or may be formed integrally with the sleeve 50, if desired, the annulus 60 fixing the diameter of this end of the outer sleeve 50 whereby the fingers 52 may flex thereabout in operation of the chuck.

A stop ring 61 is secured to the rear of inner sleeve 25 as by means of bolts 62 seated in countersunk recesses 63, ring 61 being provided on its face with bore 64 in which seat the ends of coil spring 65, the other ends of which seat against annulus 60 biasing the same, and consequently flexible fingers 52 and their associated protuberances 53 toward the inner side of flange 37. Set screws 66 engaging in threaded bores extending from the rim of stop ring 61 serve to retain the springs in recesses 64.

A screw or bolt 70 extends through annulus 60 and is provided on its inner end with a roller or follower 71, which engages in a longitudinal groove 72 in inner sleeve 25 to prevent rotary movement of outer sleeve 50 relative to inner sleeve 25, and consequent dislodgement of protuberances 53 from their proper alignment with grooves or channels 43.

Bores 75 in the outer face of annulus 60 contain adjusting bolts or screws 76 provided with adjusting nut 77, which may be moved linearly to determine the maximum distance the annulus 60 and its associated flexible fingers may travel toward stop ring 61 against the compression of spring 65 thereby defining an adjustable stop means.

From the foregoing the use and operation of the device should now be readily understandable. Opposed chucks 20 are mounted on opposite shafts 18, and as supports or uprights 11 are moved toward the bore 21 of core 22, the chucks 20 move into the bore, until the annulus 60 is engaged by the face surface or end of the core. Further movement moves annulus 60 outwardly against the bias of spring 65 which causes the inclined surfaces 54 of protuberances 53 to ride up the inclines of grooves 43 and flutes 40, moving the ends of flexible fingers 52 carrying the protuberances 53 outwardly into clamping engagement with the interior of bore 21 to hold the core 22 in position between the chucks. The outer surfaces of each flexible finger 52 are preferably arcuate, as shown, at least over a substantial portion of their length, concentric with respect to the inner sleeve 25 to provide a substantial area for clampingly engaging the portions of the article defining the bore 21.

Upon reverse movement of the uprights or standards or supports 11 withdrawal of the chuck permits springs 65 to move annulus 60 outwardly, whereupon coil spring 55 contracts flexible fingers 52 and their protuberances 53 in accordance with the relative elevation of the inclined surfaces 41 of flutes 40 until the chucks may be readily withdrawn without the exertion of any pressure on the interior of bore 21.

It will now be seen that there is herein provided an improved chuck for holding cores or tubes of the shaftless variety having internal bores therein, or other similar articles, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. A chuck for holding articles having portions defining a bore therein with a face surface surrounding the bore comprising an inner sleeve having two ends, a multiplicity of peripherally spaced, radially extending, flutes on said inner sleeve having inclined outer surfaces over at least a portion of their length ranging from a minimum diameter adjacent one of said ends of said inner sleeve to a maximum diameter toward the other of said ends of the same, an outer sleeve having two ends, a corresponding multiplicity of peripherally spaced, radially extending, flexible fingers defined by said outer sleeve, one of said flexible fingers being associated with each of said flutes, a protuberance carried by each of said flexible fingers adjacent one of said ends of said outer sleeve, each of said protuberances having an inner surface inclined in conformity to the configuration of its associated flute, resilient means surrounding said flexible fingers over said protuberances maintaining said inclined inner surface of each protuberance in sliding engagement with the inclined outer surface of its associated flute, and an annulus carried by the other end of said outer sleeve fixing the diameter of the same, said annulus being engaged by the face surface of the article surrounding the bore to slide said inclined inner surface of each protuberance along said inclined outer surface of its associated flute to expand said flexible fingers into clamping engagement with the portions of the article defining the bore.

2. The structure of claim 1 wherein each of said flexible fingers includes an arcuate outer surface over a substantial portion of its length, said arcuate outer surface being substantially concentric with said inner sleeve.

3. The structure of claim 1 further including, in combination, a stop ring carried by said inner sleeve adjacent the other end of the same, spring means acting between said annulus and said stop ring and normally biasing said flexible fingers away from clamping engagement with the portions of the article defining the bore, and adjustable stop means carried by said annulus and extending toward said stop ring for limiting the movement of said annulus against the bias of said spring means.

4. The structure of claim 1 further including, in combination, a longitudinal channel defined exteriorly of said inner sleeve, and a roller carried interiorly of said outer sleeve and ridingly engaged in said channel to prevent relative rotation between said inner sleeve and said outer sleeve.

References Cited by the Examiner

UNITED STATES PATENTS

| | | | |
|---|---|---|---|
| 2,075,192 | 3/37 | George | 279—2 |
| 2,332,576 | 10/43 | Iversen | 279—2 |
| 2,379,210 | 6/45 | Alyea | 279—2 |

FRANK SUSKO, *Primary Examiner.*
ROBERT C. RIORDON, *Examiner.*